United States Patent [19]
Pollack et al.

[11] 3,980,396
[45] Sept. 14, 1976

[54] LIQUID CRYSTALLINE DEFLECTION AND MODULATION SYSTEM

[75] Inventors: Joel M. Pollack, Rochester; Richard F. Bergen, Ontario, both of N.Y.

[73] Assignee: Xerox Corporation, Stamford, Conn.

[22] Filed: Feb. 25, 1975

[21] Appl. No.: 552,899

[52] U.S. Cl. .......................... 350/160 LC; 252/299; 350/96 C; 350/96 WG; 350/162 R
[51] Int. Cl.[2] .......................................... G02F 1/13
[58] Field of Search ...... 350/96 WG, 96 C, 160 LC, 350/162 R

[56] References Cited
UNITED STATES PATENTS

| | | | |
|---|---|---|---|
| 3,804,489 | 4/1975 | Li et al. | 350/160 R |
| 3,838,908 | 10/1974 | Channin | 350/160 LC |

*Primary Examiner*—Edward S. Bauer
*Attorney, Agent, or Firm*—James J. Ralabate; Michael H. Shanahan; George J. Cannon

[57] ABSTRACT

Deflection and modulation of monochromatic light is achieved by providing an about 1 micron to about 6 micron thick layer of homogeneously aligned nematic liquid crystalline material having negative dielectric anisotropy between two transparent electrodes; applying a voltage between the two electrodes at a voltage level above the threshold voltage level for parallel variable diffraction mode for said nematic liquid crystalline material; directing a ribbon or beam of monochromatic light into the layer of nematic liquid crystalline material and coplanar therewith; and increasing and decreasing the applied voltage so that light diffracted by the parallel variable grating mode nematic is deflected at an angle which either exceeds or is less than a critical angle $\theta_c$. When the deflection of diffracted light is increased in excess of critical angle $\theta_c$ the incident monochromatic light is diffracted through the nematic layer and the electrodes; and, when the deflection angle of the diffracted light is decreased below critical angle $\theta_c$ the incident monochromatic light is totally reflected within the nematic layer provided the voltage level is above the parallel variable grating mode level. At voltages below the parallel variable grating more threshold voltage level, the incident monochromatic light passes through the layer of nematic liquid crystalline material without reflection. Imaging devices utilizing the above deflection and modulation are disclosed.

8 Claims, 5 Drawing Figures

LIQUID CRYSTALLINE DEFLECTION AND MODULATION SYSTEM

BACKGROUND OF THE INVENTION

This invention relates to deflection and, more particularly, to deflection utilizing the parallel variable grating mode domain formation in thin layers of nematic liquid crystalline materials having negative dielectric anisotropy.

Liquid crystal diffraction gratings are known. See, for example, Carroll, *Journal of Applied Physics*, 43, 3 (1972); Greubel and Wolff, *Applied Physics Letter*, 19, 213 (1971). Variable grating mode domains in nematic liquid crystalline materials as distinguished from the Williams domains were denoted as such by Penz and Ford, *Physical Review A*, 6, 414 (1972) and studied by Greubel and Wolff. The Greubel and Wolff studies showed that the domains in the variable grating mode were formed in a direction perpendicular to the initial homogeneous alignment of the nematic liquid crystalline material. This alignment is hereinafter referred to as the perpendicular variable grating mode.

U.S. Pat. Nos. 3,758,195 and 3,813,145 to Hedman et al are directed to information display apparatus utilizing as a diffraction grating a cell containing a liquid crystalline material. It is believed that, at least in some instances, the diffraction results reported in these patents inherently resulted from a variable grating mode nematic liquid crystalline material having negative dielectric anisotropy and that, in some instances, the long axes of the domains in the variable grating mode were parallel to the initial homogeneous alignment (hereinafter referred to as parallel variable grating mode) rather than perpendicular as reported in the Greubel and Wolff article.

In new and growing areas of technology such as liquid crystal technology, new methods, apparatus, compositions, and articles of manufacture are often discovered for the application of the new technology in a new mode. The present invention relates to a novel deflection system utilizing the parallel variable grating mode in nematic liquid crystalline materials.

SUMMARY OF THE INVENTION

It is, therefore, an object of this invention to provide a novel method for reflecting and modulating monochromatic light.

It is another object of this invention to provide selective diffraction of monochromatic radiation incident upon and coplanar with a layer of nematic liquid crystalline material.

It is still a further object of this invention to provide a novel imaging scheme.

It is another object of this invention to provide image amplification.

It is a further object of this invention to provide a novel display which can be viewed directly or projected.

It is still a further object of this invention to provide a novel means for modulating zero-order light.

The foregoing objects and others are accomplished in accordance with this invention by providing two electrodes, an about 1 to about 6 micron thick layer of homogeneously aligned nematic liquid crystalline material having negative dielectric anisotropy; applying a d.c. voltage between said two electrodes at or above the parallel variable grating mode voltage level for the nematic liquid crystalline material; directing a ribbon or beam of monochromatic light into and coplanar with the layer of nematic liquid crystalline material; and increasing or decreasing the applied d.c. voltage above the voltage level for parallel variable diffraction mode wherein diffracted light is deflected at an angle greater than or less than the critical angle existing between the nematic liquid crystalline layer and one of the electrodes. The phrase "critical angle" is used herein to mean a fixed angle $\Theta_c$ in excess of which diffracted light is deflected through the sandwiched structure. $\Theta_c = \pi/2 - \phi_c$; where $\sin \phi_c = n/n'$; wherein $n$ is the optical index of refraction for the electrode of interest and $n'$ is the optical index of refraction for the nematic liquid crystalline material.

BRIEF DESCRIPTION OF THE DRAWINGS

For a better understanding of the invention, as well as other objects and further features thereof, reference is made to the following detailed disclosure of the preferred embodiments of the invention taken in conjunction with the accompanying drawings thereof, wherein.

DESCRIPTION OF THE PREFERRED EMBODIMENTS

Figure 2:
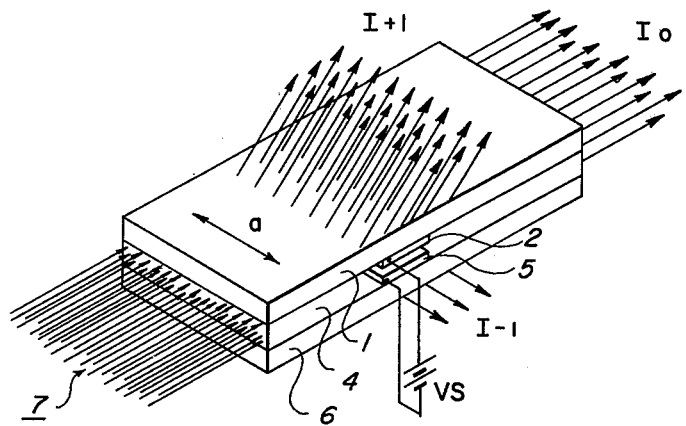
FIG. 2 is a partially schematic illustration of the deflection and modulation provided in accordance with the practice of the present invention.

Referring now to FIG. 2, there is seen a deflector comprising substrates 1 and 6, conductive coatings 2 and 5, and layer 4 of nematic liquid crystalline material having negative dielectric anisotropy.

The substrates 1 and 6 can comprise any suitable electrically insulating substrate. Typical suitable electrically insulating substrate materials include glass, plastic, ceramics, and other electrically insulating materials. Substrates 1 and 6 are transmissive or semitransmissive to incident monochromatic light 7. Conductive coatings 2 and 5 can comprise any suitable electrically conductive material. Typical suitable electrically conductive materials include gold, indium oxide, tin oxide, silver, and other conductors. Conductive coatings 2 and 5 are sufficiently thin so as to be transmissive to diffracted portions of monochromatic light 7, denoted as $I_{+1}$ and $I_{-1}$.

Incident monochromatic light 7 passes through nematic layer 4 in a direction coplanar with layer 4. Layer 4 of nematic liquid crystalline material is in the parallel variable grating mode between conductive coatings 2 and 5 as a result of an applied d.c. voltage from source VS. In passing through this mode of layer 4, incident light 7 is diffracted into orders of light. For purposes of display clarity, the +1 and −1 orders of diffracted light are preferably deflected through the conductive coatings. However, it will be understood to those skilled in the art that a plurality of orders of diffracted light is typically provided when the phenomena of light diffraction occurs and these can also be made to deflect through the conductive coatings. Further, it will be noted that an angle exists between the zero order light and the +1 and −1 orders of light. The relationship between the diffraction angle and the spatial frequency of the liquid crystalline grating is simply given by the Bragg relationship $n\lambda = d \sin \Theta$ where $n$ is the order of diffracted light, $\lambda$ is the wavelength of light and $d$ is the domain width. While this is shown, for convenience, to exist between the +1 order and zero-order of light in FIG. 2, it will be appreciated by those skilled in the art that each positive and negative order of diffracted light makes an angle with the zero-order of light also given by the Bragg relation. Further, when light 7 is directed into nematic layer 4 and coplanar therewith the angle made by the +1 and −1 diffracted orders of light are equal, the angles made by the +2 and −2 orders of diffracted light are equal, and so forth. Under these conditions, the intensity of light in the +1 order of diffracted light is equal to the intensity of light in the +1 order of diffracted light, the intensity of light in the +2 order of diffracted light is equal to the intensity of light in the −2 order of diffracted light, and so forth.

Figure 1:
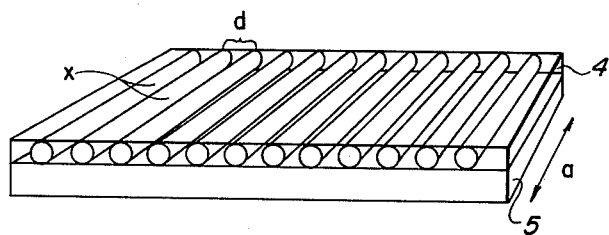
FIG. 1 is a partially schematic illustration of the parallel variable grating mode domains utilized in the practice of the present invention.

Layer 4 of nematic liquid crystalline material is in the parallel variable grating mode and has parallel, vortical domains, $x$. The parallel variable grating mode is a voltage threshold phenomena in that each thin (1 to 6 micron) layer of dielectrically negative nematic exhibits the parallel mode at and above a particular level of voltage specific to the nematic employed. A description of the parallel variable grating mode is best made in conjunction with FIG. 1. Referring now to FIG. 1 there is seen conductive coating 5 upon which resides layer 4 of nematic liquid crystalline material having negative dielectric anisotropy. The direction $a$ is the direction of zero-field homogeneous alignment in which the nematic liquid crystalline material is initially placed, and the rod-shaped domains $x$ represent tubular, vortical domains of the liquid crystalline material which are exhibited when the liquid crystalline material is in the parallel variable grating mode. The long or major axes of $x$ are parallel to the $a$ direction. The vortical domains are believed to be formed due to the combined action of the applied d.c. voltage and charge injection upon the nematic liquid crystalline layer 4. It is further believed that the net effect of the combined action results in a torque which results in vortical movement of the nematic liquid crystalline material. It has been observed that adjacent vortical domains thus formed in layer 4 rotate in opposite directions. The distance $d$ between adjacent vortical domains and the size of the vortical domains have been found to vary inversely in width with the magnitude of the applied d.c. voltage. That is, with an increase in applied d.c. voltage the size of adjacent domains and the distance therebetween decreases whereas with decreasing d.c. voltage the size of the vortical domains and the distance therebetween increases. Therefore, the spatial frequency of the resulting grating increases with increasing voltage level and decreases with decreasing voltage level. Spatial frequencies from about 125 to more than 2000 domains per millimeter have been obtained.

As is well known to those skilled in the art, for a given wavelength of incident light the angle of diffraction for any given order of diffracted light away from the zero-order is related to the spatial frequency of the diffraction grating by the Bragg equation. Hence, higher voltage levels result in a higher spatial frequency which, in turn, results in a greater angle of diffraction from the zero-order for any given order of diffracted light.

Referring again to FIG. 2, it will now be appreciated that if the voltage level applied between conductive coatings 2 and 5 is at a level less than the threshold level for the formation of the parallel variable grating mode no light is diffracted and all light simply passes undeviated through the layer as zero-order light. When the voltage applied between coatings 2 and 5 exceeds the threshold for the formation of the parallel variable grating mode but is not in excess of the voltage which diffracts light of plus and minus orders at the critical angle of reflection of the liquid crystal-electrode interface for a given order of diffraction, the light of that order reflects within the layer and emerges from the layer along with the zero-order light. For voltages in excess of the voltage corresponding to the formation of domains of a spatial frequency that diffracts a given order (plus and minus) at an angle exceeding the critical angle of the liquid crystal-electrode interface, the diffracted light of that order passes through the electrode(s) and substrate(s) 2 and 1 and/or 5 and 6 emerging at an angle corresponding to the spatial frequency of the grating at that voltage as given by the Bragg relationship.

The critical angle $\Theta_c$ is equal to $\pi/2 - \phi_c$ where $\sin \phi_c = n/n$, wherein $n$ is the optical index of refraction for the electrode of interest and $n'$ is the optical index of refraction for the nematic liquid crystalline material. The incident coplanar light is diffracted at an angle $\Theta$ from the zero order light. The value of $\Theta$ can be determined from the Bragg relationship. When $\Theta > \Theta_c$ diffraction out of the structure occurs.

Light of relatively longer wavelength is diffracted to a greater degree from zero-order light than light of relatively shorter wavelength and, therefore, light of longer wavelength will diffract at the critical angle at a lower d.c. voltage level than light of shorter wavelength. For a given (a) thickness of nematic layer 4, (b) wavelength of incident light 7, (c) conductive coating, and (d) nematic liquid crystalline material in layer 4; there is a critical d.c. voltage level at which the angle of diffraction for a given wavelength of incident radiation exceeds the critical angle for a given order. Higher orders emerge from the layer at lower voltages than lower orders. That voltage, for a given wavelength of light, is herein denoted as the critical angle voltage for that wavelength of light. For purposes of illustration it shall be intended here to refer to the brightest, or more specifically, the first order diffracted light. At or above the critical angle voltage the given wavelength of light will be deflected out of nematic layer 4 through the conductive coatings; and, below the critical angle voltage that wavelength will pass through nematic layer 4 and exit with zero-order light $I_0$.

The deflector can be made by any of the techniques commonly used in the liquid crystalline electro-optic device art since the deflector has in common with that art the layer of liquid crystalline material sandwiched between two electrodes. The primary difference between the device utilized in the present invention and the prior electro-optic liquid crystalline devices is that the thickness of nematic layer 4 should be substantially uniform and within the range from about 1 micron to about 6 microns; the nematic liquid crystalline material used in nematic layer 4 must have negative dielectric anisotropy; the nematic liquid crystalline material in the absence of an applied d.c. voltage should be substantially uniformly aligned in the homogeneous texture of the nematic mesophase; and the nematic layer 4 must be subjected to a d.c. voltage applied between the two conductive electrodes which is sufficient to form the parallel variable grating mode in the nematic liquid crystalline material utilized.

Any suitable nematic liquid crystalline material having negative dielectric anisotropy can be employed in nematic layer 4. Typical suitable nematic liquid crystalline materials having negative dielectric anisotropy include: N-(p-methoxybenzylidene)-p-butylaniline (MBBA); p-azoxyanisole (PAA), N-(p-ethoxybenzylidene)-p-butylaniline (EBBA); dl-4-(2-methylhexyl)-4'-ethoxy-α-chloro-trans-stilbene; p-methoxy-benzylidene-p'-aminophenyl-3-methylvalerate (MBV); p-ethoxy-benzylidene-p'-aminophenyl-3-methylvalerate; pp'-methoxy-pentytolane (MPT); pp'-propoxyheptyltolane (PHT); pp'-dioctoxytolane (DOT), trans-4-butyl-α-chloro-4'-ethoxystilbene and Phase IV and Phase V, nematic liquid crystalline phases available under the trademark Licristal from E.M. Laboratories, Inc. Phase IV is a eutectic mixture of

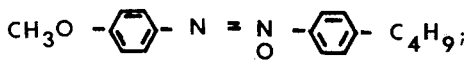

Phase V is a mixture of Phase IV and the eutectic mixture of

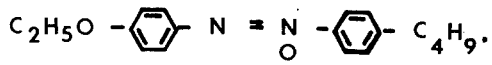

Typically, spacers are included in device construction to separate the conductive coatings 2 and 5 and to provide the space which is to be occupied by nematic layer 4. Such spacers are typically chemically inert, transparent, substantially insulating and have appropriate dielectric characteristics. Typical suitable materials utilized for spacers include: cellulose acetate, cellulose triacetate, cellulose acetate butyrate, polyurethane elastomers, polyethylene, polypropylene, polyesters, polystyrene, polycarbonate, polyvinylfluoride, polytetrafluoroethylene, polyethylene terephthalate, and mixtures thereof. It is preferred to utilize vacuum evaporative metals which are vacuum evaporated upon one of the substrates 1 and 6 in regions not mutually covered by metallic electrodes 2 or 5. Such metals include gold, copper, silver, aluminum, chrome, and other suitable vacuum evaporative metallic material. These materials are typically placed in a tantalum boat contained in a vacuum evaporator which has been evacuated to about $5 \times 10^{-5}$ torr. Vacuum evaporative metallic posts are preferred because the evaporating process provides a much greater degree of uniformity in spacer thickness than has traditionally been provided by sheet materials; and, the substantial uniformity of spacer thickness results in diffraction efficiencies as high as about 90%.

After the spacers are provided, one or both of the electrodes is treated, inducing the nematic liquid crystalline material in layer 4 to become homogeneously aligned.

Any technique for providing homogeneous alignment of the nematic liquid crystalline material in layer 4 can be utilized and, with the exercise of care, substantially uniform homogeneous alignment can be achieved. Typical suitable homogeneous alignment techniques include the classical technique of rubbing the substrate as disclosed in P. Chatelain, *Bull. Soc. Franc. Min. Crist.*, 66, 105 (1943); providing a coating of aligning agent in contact with layer 4 of nematic liquid crystalline material such as, for example, one of the homogeneous aligning agents listed in Vol. 61, No. 7 *Proceedings of the IEEE*, p. 823, July, 1973 in the article "Surface-Produced Alignment of Liquid Crystals" by Kahn, Taylor and Schonhorn; and, the so-called Janning Technique described by J. L. Janning in *Appl. Phys. Letts.*, 21, 173 (1972). Preferably the substrate bearing the conductive coating is treated as well as the conductive coating to insure uniform zero-field homogeneous alignment.

After treatment of both of the electrodes, the two electrodes are brought into spaced relationship and separated by the vacuum evaporated spacers. The peripheral opening is epoxied lightly at several points with a fast drying epoxy resin available from the Dexter Corporation under the name Epoxy Patch. The cells are then filled with the nematic liquid crystalline material by capillary action. In use, the conductive coatings 3 and 5 are provided with suitable leads which are electrically connected to a suitable source, VS, of d.c. voltage.

EXAMPLES I–IV

Four cells having nematic layer thicknesses of about 3.7 microns, 4.0 microns, 4.7 microns and 7.4 microns are prepared as follows. Eight commercially available flat glass plates overcoated with optically transmissive indium oxide coatings and having dimensions of about 2 inches × 2 inches × ¼ inch. Each of the indium oxide coatings are selectively etched to provide a circular active area of about 1 cm², rigorously cleaned in a bath of dichromic acid and then subjected to ultrasonic cleaning followed by rinsing in highly filtered, distilled water. Four of the plates are placed in a vacuum evaporator and provided on the activation electrode side with four spacers in regions exclusive of the active area. The spacers comprise a first vacuum evaporate layer of chrome having a thickness of about 500 angstroms and, on top of the chrome, a vacuum evaporated coating of silver sufficient to provide the desired nematic layer thicknesses. All of the plates are provided with a silicon monoxide coating on top of both the active area and the glass substrate in accordance with the previously referred to Janning Technique to provide a coating which will homogeneously align nematic liquid crystalline materials and allow internal reflection at voltage levels above threshold and below critical angle voltage. The four cells having desired nematic layer thicknesses are then formed by utilizing, for each cell, one plate provided with spacers and one plate lacking spacers. The two plates are brought into spaced relationship, separated by the vacuum evaporated spacers and with the silicon monoxide coatings aligned directionally with respect to each other in opposed facing relationship. The nematic liquid crystalline Phase V available under the trademark Licristal from E.M. Laboratories, Inc. is placed in each of the four resulting cells by capillary action.

Figure 3:
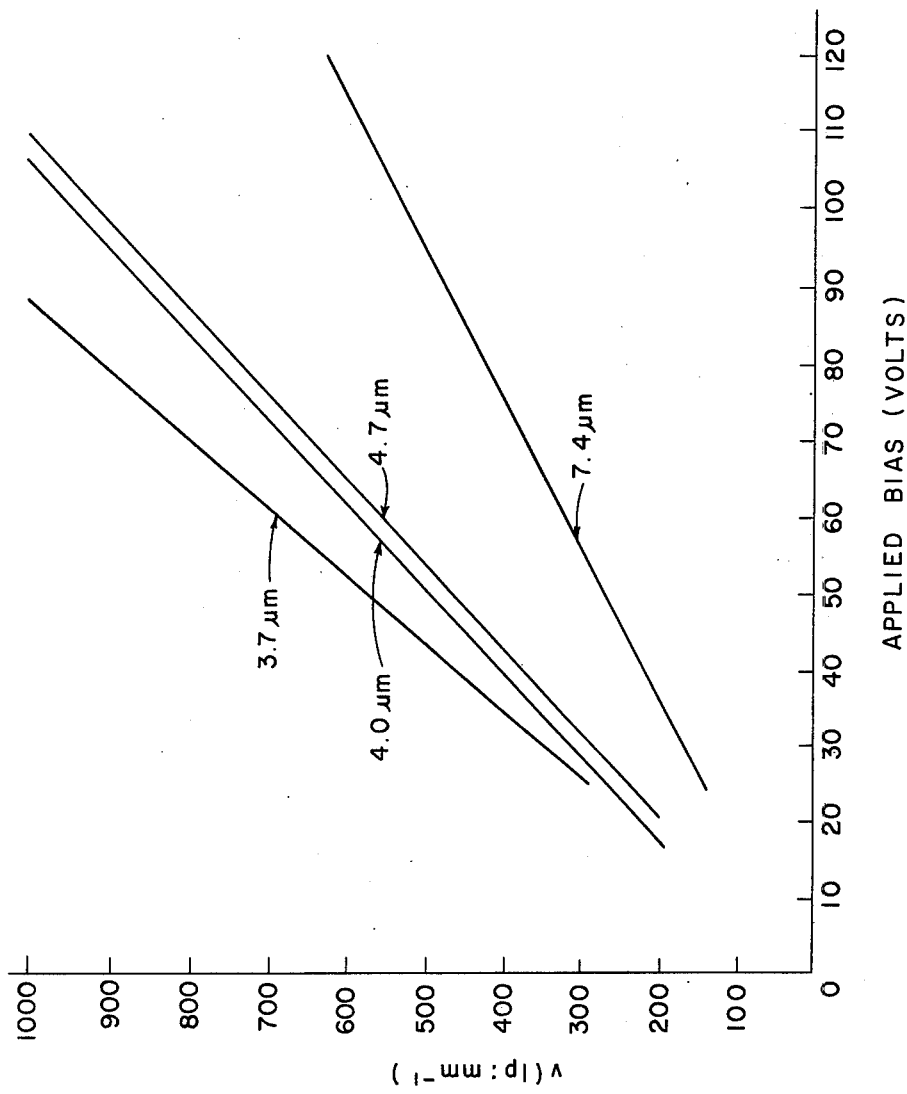
FIG. 3 is a graphical illustration of the variation in domain density as a function of applied voltage for the various layer thicknesses for a particularly preferred nematic liquid crystalline material.

Each of the four cells is investigated for spatial frequency as a function of voltage. The data obtained is shown in FIG. 3.

A helium-neon laser emitting radiation at a wavelength of about 6,328 angstroms ($6.328 \times 10^{-4}$mm) is positioned to direct the radiation into the nematic layer and coplanar therewith and orthogonal to the zero-field homogeneous alignment. Deflection of light through the active areas is observed at about 85 volts for the cell having a nematic layer of about 3.7 microns in thickness; at about 105 volts for the cell having a nematic layer of about 4 microns in thickness; at about 110 volts for the cell having a nematic layer of about 4.7 microns in thickness; and, was not observed in the cell having the about 7.4 micron thick nematic layer because turbulent hydrodynamic motion (DSM) occurred in the cell prior to achieving critical angle voltage. This demonstrates that the parallel variable grating mode provides a sufficient degree of diffraction to surpass the critical angle because, under steady state conditions, parallel variable grating mode exists only in the three thinner cells and not in the cell having a nematic layer of about 7.4 microns in thickness. The latter cell, under steady state, exhibits perpendicular variable grating mode where the domains are orthogonal to the homogeneous alignment.

From the Bragg relationship the degree of diffraction for any given order away from the zero-order can be calculated; and, from the previously given critical angle formula the angle below which total internal reflection occur can be calculated. The calculated values compare favorably to one another and to the observed experimental results.

EXAMPLES V–VIII

Optical characterizations of the four cells were obtained as follows. Polarized microscopy confirmed that uniform homogeneous alignment was obtained in the zero-field state over the entire electrodes cell area. A threshold voltage of about 10 volts d.c. was noted for all cells. The threshold voltage noted is the amount of voltage required to be applied prior to observation of any domains in the liquid crystal cell. The cell with nematic layers of about 3.7 microns, 4.0 microns and about 4.7 microns exhibited domains the major axes of which were parallel to the zero-field homogeneous alignment. Immediately upon application of the threshold field, the perpendicular variable grating mode was momentarily observed and almost immediately switched to the parallel variable grating mode. In the cell with the about 4.7 micron thick nematic layer. Upon application of the threshold voltage the cell briefly exhibited perpendicular variable grating mode but switched to the parallel variable grating mode and exhibited a preference for the parallel mode under steady state conditions. However, the about 4.7 micron thick cell, after a rest period of about 2 days, would initially exhibit the perpendicular variable grating mode under steady state conditions and then revert to the parallel variale grating mode with use.

The cell with the about 7.4 micron nematic layer exhibited a preference under steady state conditions of applied threshold voltage for the perpendicular variable grating mode. That is, it exhibited the classical variable grating mode reported by Greubel and Wolff. The about 7.4 micron thick nematic layer would momentarily go into the parallel variable grating mode during extended use.

Accordingly, it is concluded that the about 4.7 micron thick cell and the about 7.4 micron thick cell bracket the thickness limit for cells displaying the parallel variable grating mode in that the thicker cells shows a steady state preference for the perpendicular variable grating mode and the thinner cell shows a steady state preference for the parallel variable grating mode.

Other observations in Examples V–VIII include: the domain patterns in both parallel and perpendicular variable grating mode were stationary at a fixed voltage at or above threshold voltage, but with increasing voltage the width of the individual domains decreases. The perpendicular variable diffraction mode (thicker) cell exhibited dynamic scattering at voltages somewhat above threshold; whereas, for the parallel variable grating mode (thin) cells, the width of the individual domains continued to diminish for voltages up to the level for electrical breakdown.

Figure 4:
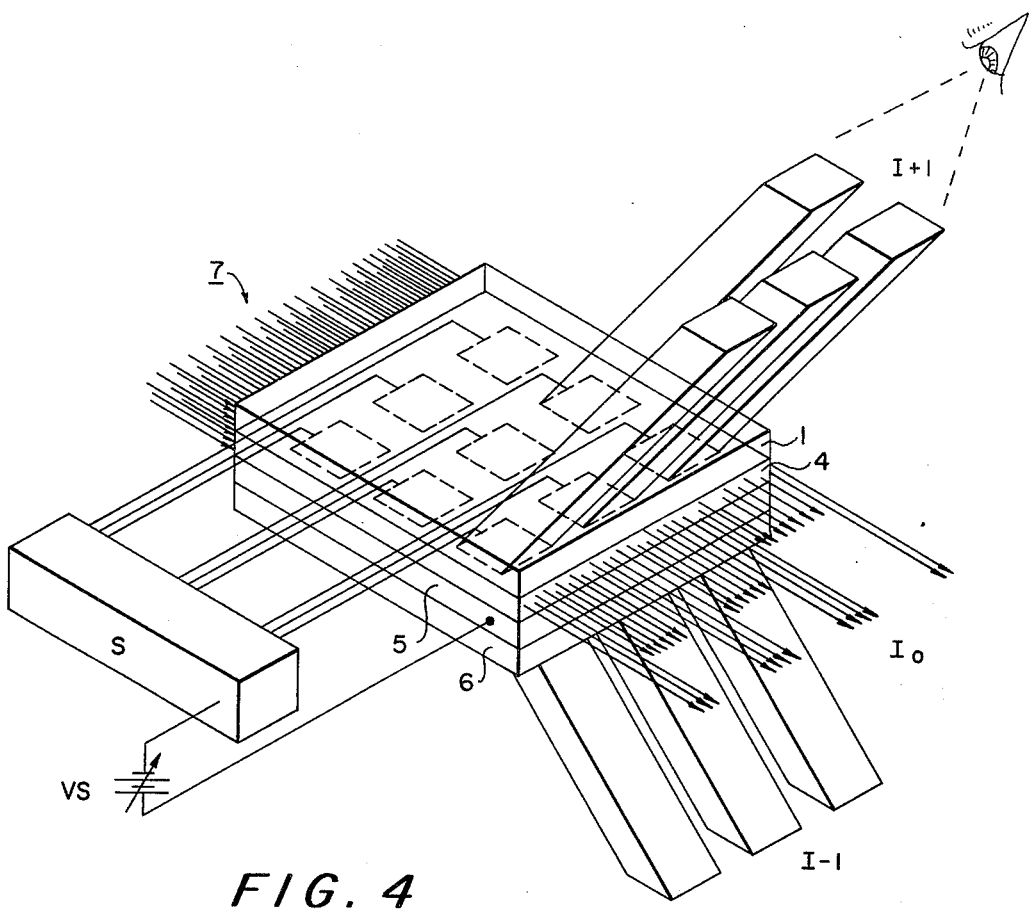
FIG. 4 is a partial schematic illustration of an image display embodiment utilizing the practice of the present invention.
Figure 5:
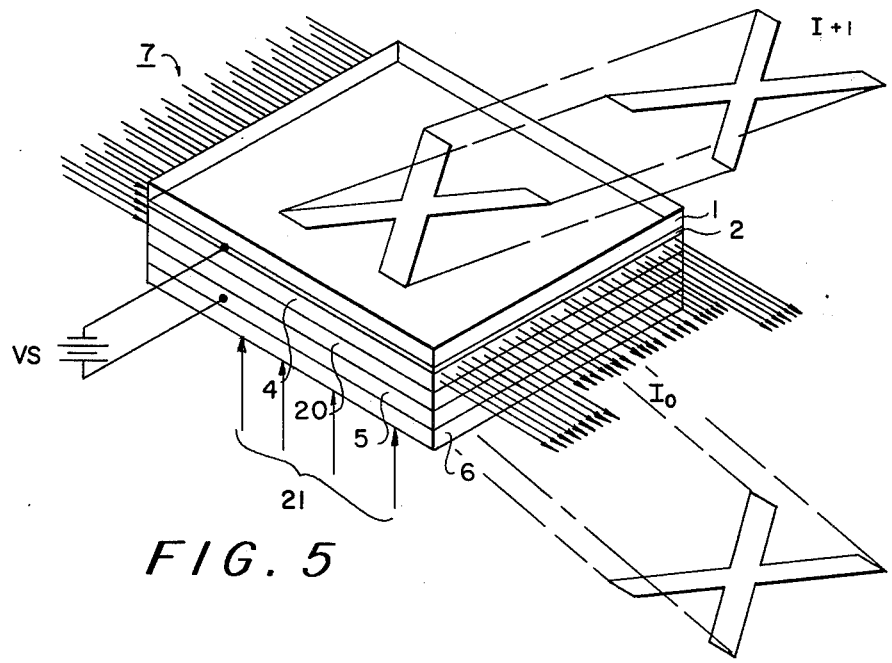
FIG. 5 is a partial schematic illustration of another image display utilizing the practice of the present invention.

Referring now to FIG. 4 and FIG. 5, display embodiments utilizing the method provided by the practice of the present invention are illustrated. Like numerals in FIGS. 4 and 5 refer to like numerals in FIG. 2.

Display FIG. 4 comprises substrates 1 and 6, conductive coatings 2 and 5, and layer 4 of nematic liquid crystalline material having negative dielectric anisotropy. Conductive coatings 2 are provided in relatively small rectangular coatings on the surface of substrate 1 in contact with layer 4. Conductive coatings 2 are electrically connectable to one polarity of voltage source VS through selectable switch S. Selective switch mechanism S selectively electrically connects one or more of discrete conductive coatings 2 in any desired image configuration. As shown in FIG. 4, the discrete conductive coatings 2 marked with an asterisk are selectively electrically connected to voltage source VS. The other polarity of voltage source VS is electrically connected to conductive coating 5 which, in this case, can be a continuous coating upon substrate 6. Voltage source VS is adjusted to provide a voltage across the layer 4 of nematic liquid crystalline material above the parallel variable grating mode voltage level and above the critical angle voltage level. When that condition exists, incident radiation 7 is diffracted by the parallel variable grating mode in those regions and is deflected by diffraction in excess of the critical angle thereby allowing the diffracted light to pass through activated discrete coatings 2 and corresponding areas of substrate 1. A person 22 in visual alignment with the direction of diffraction perceives beams of light emanating from the activated discrete conductive coating 2. It will be appreciated, of course, that any photosensitive imaging member may be placed in optical alignment with the direction of the diffracted light for purposes of making an image. The zero-order light $I_0$ represents the residual of incident light 7 which was not deflected out of layer 4. The light deflected out of layer 4 can be either the (+) or (−) diffraction of any given order of diffracted light provided that the degree of deflection is sufficient to exceed the critical angle. For purposes of clarity, the +1 and −1 diffractions of the first order of light is shown. It will be appreciated that appropriate optical stops can be employed to optically isolate any given order of light.

FIG. 5 illustrates another scheme for creating an imagewise pattern of voltage across layer 4 in excess of the critical angle voltage level for layer 4. In this embodiment, conductive coating 2 is continuous and photoconductive layer 20 is inserted between the conductive coating 5 and layer 4 of nematic liquid crystalline material. Imagewise configured input 21 (here, in the shape of an X), is selected to be actinic to the photoconductive material employed in photoconductive layer 20. The imagewise configured actinic radiation 21 causes photoconductive layer 20 to become conductive in corresponding imagewise configuration. This, in effect, creates an imagewise conductivity pattern which allows voltage from source VS to be applied across layer 4 in imagewise configuration. When voltage source VS is adjusted to provide voltage across layer 4 in excess of the critical angle voltage level, incident monochromatic light 7 is deflected out of layer 4 and passes through conductive coating 2 and substrate 1 in an imagewise configuration corresponding to the imagewise configured actinic radiation 21. Photoconductive layer 20 can comprise any photoconductive material non-actinic to radiation 7 such as, for example, those typically used in the xerographic art. Any thickness of photoconductive layer 20 can be employed so long as the desired effect of response to actinic radiation 21 and creation of an imagewise configured voltage above the critical angle threshold can be provided for the voltage source utilized. Since layer 4 of nematic liquid crystalline material must be from about 1 to about 6 microns in thickness, a photoconductor thickness of about 2 microns to about 100 microns is preferred because of enhanced image resolution within that range.

While the invention has been described in detail with respect to certain embodiments thereof, it is not intended to be limited thereto, but rather will be appreciated by those skilled in the art that modifications and variations are possible which are within the spirit of the invention and the scope of the claims.

For example, light propagating within a layer of liquid crystalline material and deflected therefrom in accordance with the practice of the present invention can be viewed either directly by an observer or by projection through an appropriate optics upon a screen. Further, the FIG. 5 embodiment may comprise a photoconductive layer sensitive to infrared radiation and used to convert an infrared image into a visible image. Also, the FIG. 5 embodiment can be employed to amplify an image such as that from a cathode ray tube. The cathode ray tube of relatively low intensity can be used as actinic radiation source 21 to activate photoconductive layer 20. The relatively high intensity monochromatic light 7 is deflected out of nematic layer 4 to provide an amplified image corresponding to the relatively faint cathode ray tube image.

The practice of the present invention can be employed in situations where an object must be kept in view but where it is desirable to provide changing information to the viewer, either with respect to that object or with respect to some other matter. For example, the FIGS. 4 and 5 embodiments can be provided in sufficiently thin configurations that, incorporated into a helmet, they are transparent to the viewer. Communicative information can be provided to him without disrupting his vision because the incident radiation 7 can be oriented perpendicular to the direction of viewing and only the deflected informative information is diverted into the viewers eyes.

It will be further appreciated that light deflected out of nematic layer 4 can be deflected at any angle greater than the critical angle by merely increasing the voltage across nematic layer 4. In this manner, the practice of the present invention can be utilized to provide a scanning capability. This can be done overall or alternatively in individual segmental creas as afforded by the electrodes. This capability is particularly suitable for selectively addressing a matrix or an array of elements optically sensitive to the monochromatic light.

While the invention specifically mentions a ribbon of light, 7, for illumination of the nematic layer it shall be understood that a narrow beam can also be used if scanned across the entrance aperture of the layer. Scanning of this nature could be accomplished using a fiber optic bundle. Choosing a bundle which has a circular cross-section for one end connected to a linear arrangement for the other end to be located adjoining the nematic layer one could illuminate the circular end through a circumferentially rotating aperture to produce a linear scan for illuminating the layer. This, in conjunction with coincidence circuitry, could be used, for example, to simplify addressing procedures.

Also, there exists a class of devices known as thin film transistors (TFTs) which by means of state of the art silicon IC techniques can be deposited between the activation electrode segment(s) 2 or 5 and the substrate(s) 1 or 6. These TFTs could for example be used to favorably alter the threshold voltage for the formation of the parallel variable grating mode either collectively or individually. This could be used to simplify addressing procedures for large arrays of electrode segments as desired.

Other types of semiconductor elements incorporated into the electrode structure could for example be used to modify the applied voltage to a particular segment such that light diffracted from one segment can be made to differ in angle from adjacent segments for a constant voltage applied to the underlying electrode.

These and other uses apparent to one familiar with the state of the art of thin film semiconductor devices shall be understood to be within the spirit of the invention and scope of the claims.

What is claimed is:

1. A method for selectively, variably deflecting light of any given wavelength, λ, comprising:
    a. providing between two transparent electrodes, an about 1 micron to about 6 micron thick layer of homogeneously aligned nematic liquid crystalline material having negative dielectric anisotropy;
    b. directing monochromatic light of any given wavelength, λ, into an coplanar with said layer of nematic liquid crystalline material; and
    c. applying a d.c. voltage, between said two electrodes, at least at the parallel variable grating mode threshold level for said nematic liquid crystalline material wherein vortical domains of said liquid crystalline material are formed in a direction parallel to the direction of initial homogeneous alignment, said domains being substantially parallel one to the other and having a spatial frequency dependent upon the magnitude of said d.c. voltage, said d.c. voltage being above the critical angle voltage level for said light of wavelength, λ, wherein said spatial frequency is sufficient to defract said light of wavelength, λ, through said layer of liquid crystalline material and said electrodes.

2. The method of claim 1 further including the step of decreasing said applied d.c. voltage to below the critical angle voltage level for said light of wavelength λ.

3. The method of claim 1 wherein said d.c. voltage is provided in imagewise configuration.

4. The method of claim 3 wherein one of said electrodes comprise a transparent substrate having a plurality of discrete electrically conductive coatings selectively electrically connected to a suitable voltage source.

5. The method according to claim 3 further including between said layer of nematic liquid crystalline material and one of said two electrodes, a photoconductive layer and wherein said step (c) comprises impinging said photoconductive layer with actinic radiation in imagewise configuration.

6. The method according to claim 1 wherein said nematic liquid crystalline material comprises a mixture of the eutectic mixture of

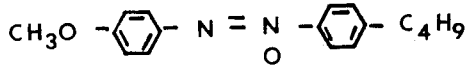

and

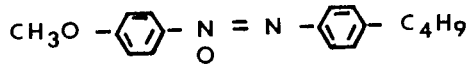

and the eutectic mixture of

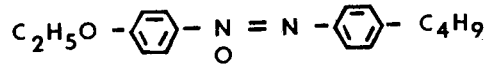

and

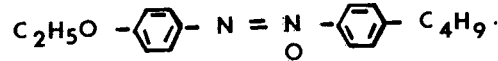

7. The method according to claim 6 wherein said light of wavelength λ is red.

8. The method according to claim 1 further including the step of increasing said applied d.c. voltage.

* * * * *